No. 686,796. Patented Nov. 19, 1901.
R. C. WRIGHT & F. E. STEBBINS.
CAR TRUCK.
(Application filed Nov. 12, 1900.)
(No Model.) 6 Sheets—Sheet 1.
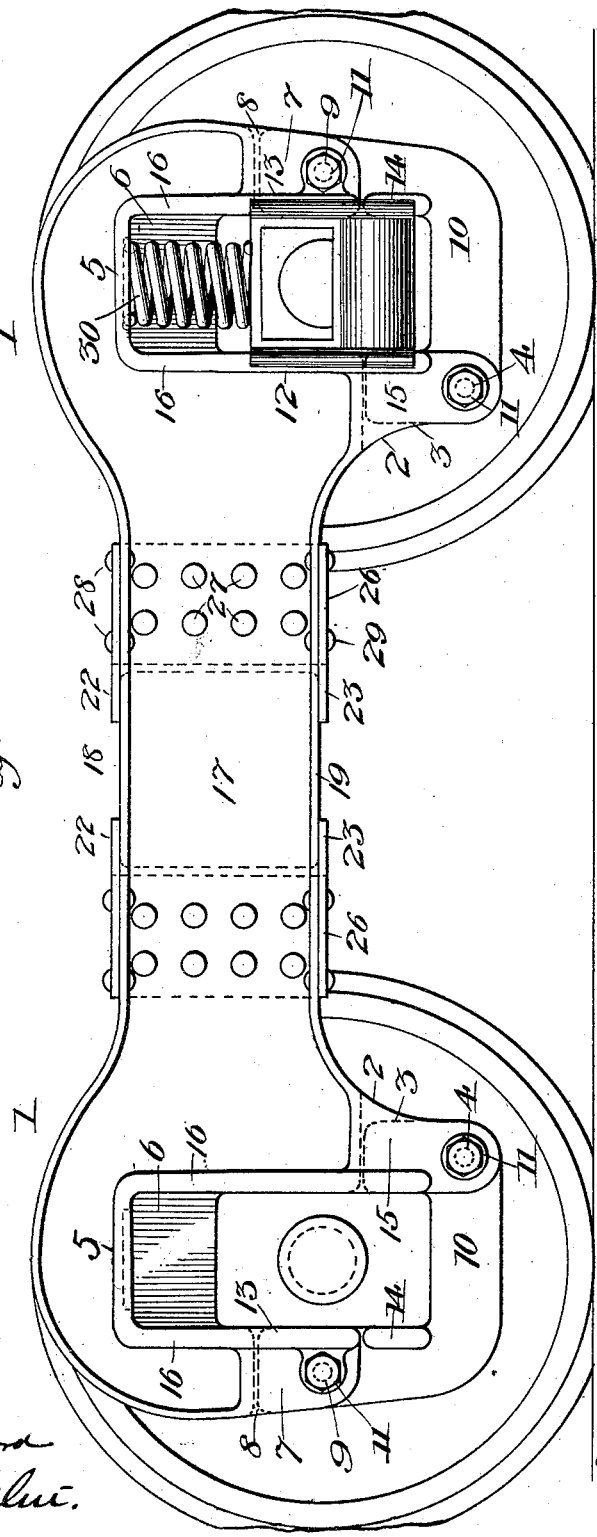
Witnesses
C. C. Clifford
D. W. Edelen
Inventors
Ransom C. Wright
F. E. Stebbins

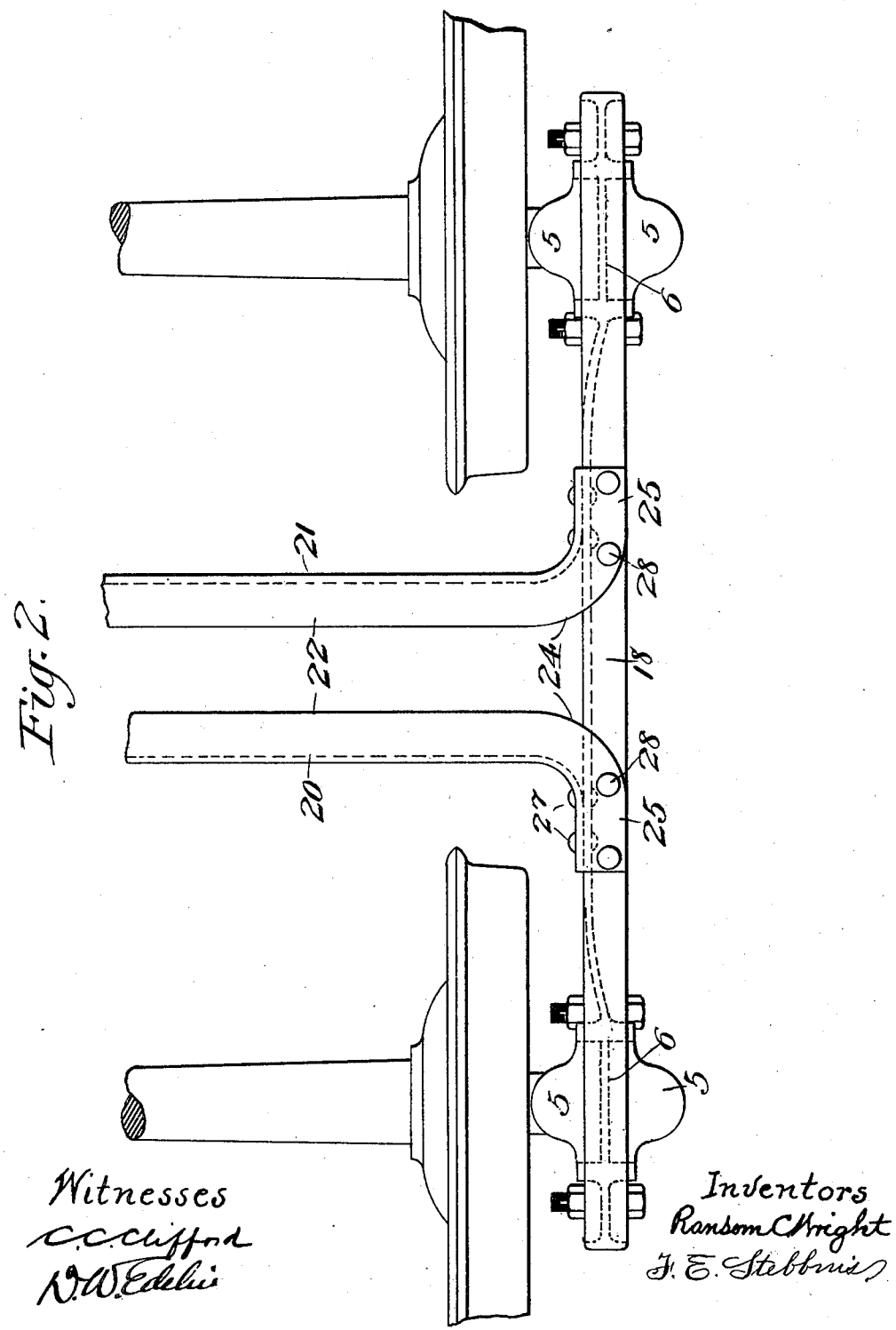

No. 686,796. Patented Nov. 19, 1901.
R. C. WRIGHT & F. E. STEBBINS.
CAR TRUCK.
(Application filed Nov. 12, 1900.)
(No Model.) 6 Sheets—Sheet 3.
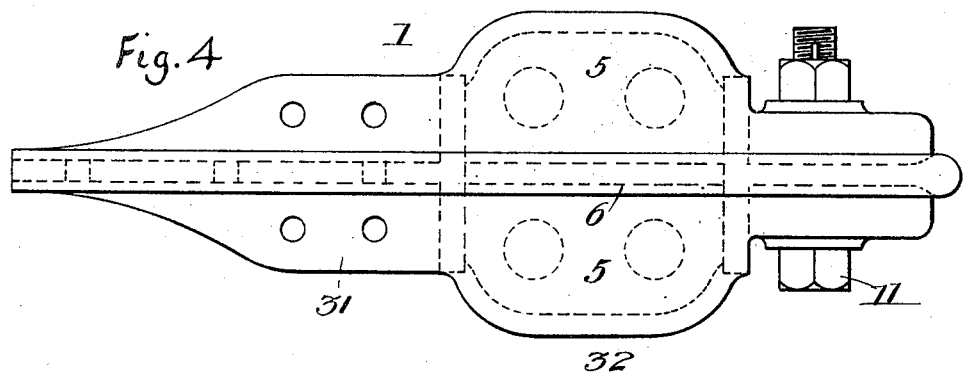
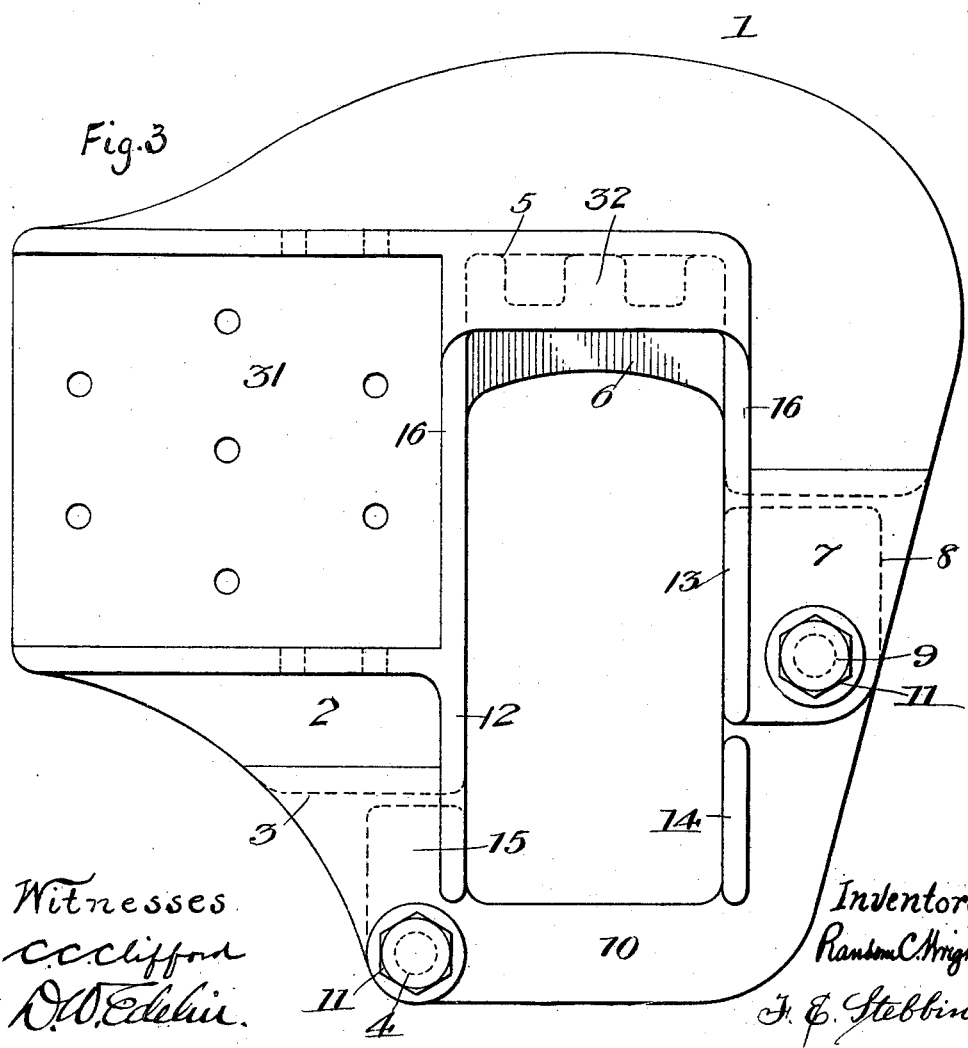

No. 686,796. Patented Nov. 19, 1901.
R. C. WRIGHT & F. E. STEBBINS.
CAR TRUCK.
(Application filed Nov. 12, 1900.)
(No Model.) 6 Sheets—Sheet 4.
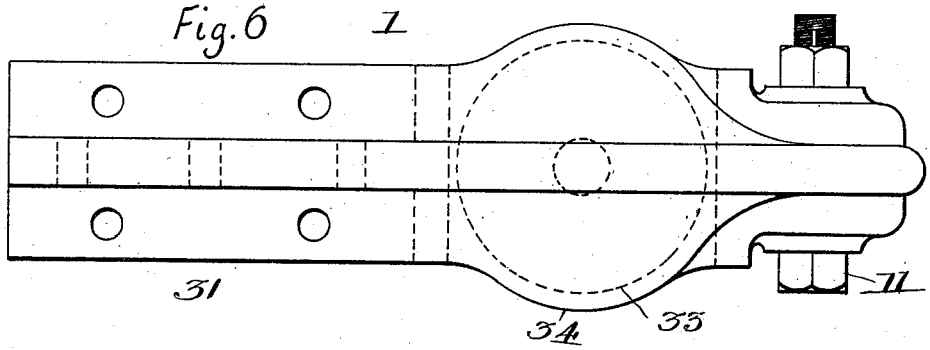
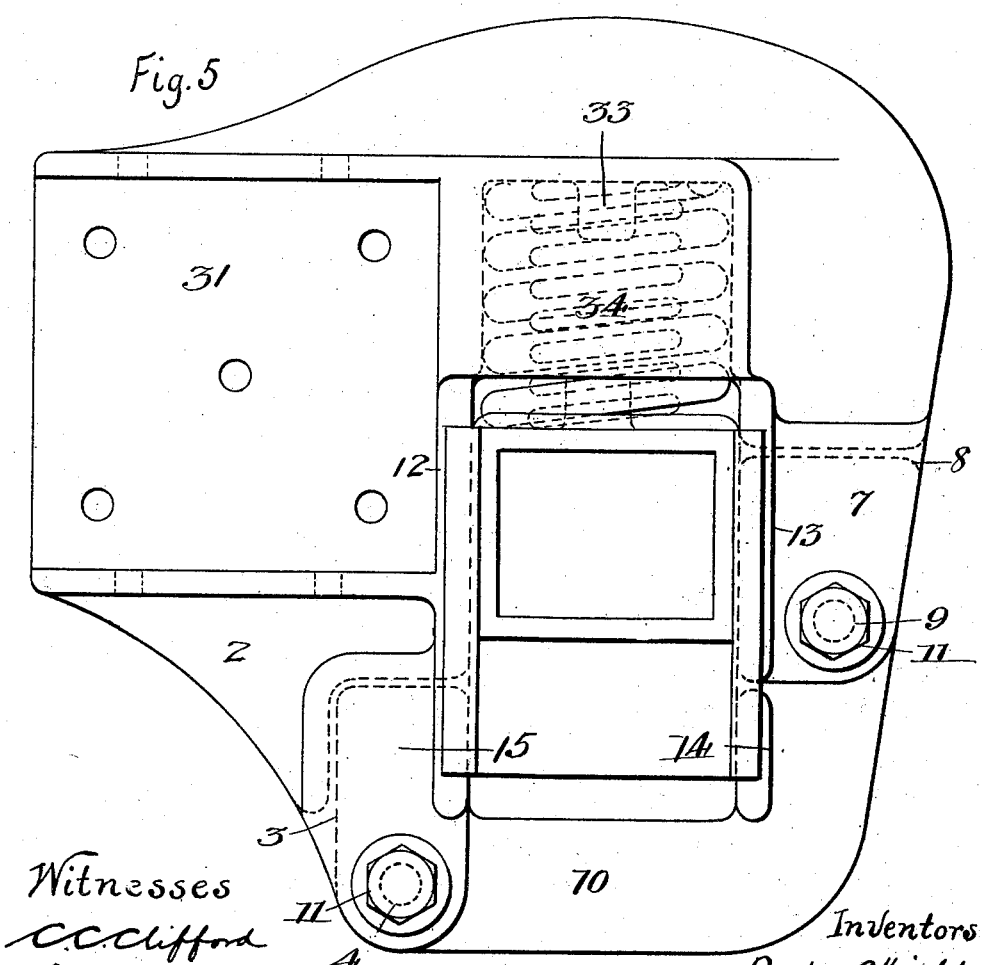

No. 686,796. Patented Nov. 19, 1901.
R. C. WRIGHT & F. E. STEBBINS.
CAR TRUCK.
(Application filed Nov. 12, 1900.)
(No Model.) 6 Sheets—Sheet 5.
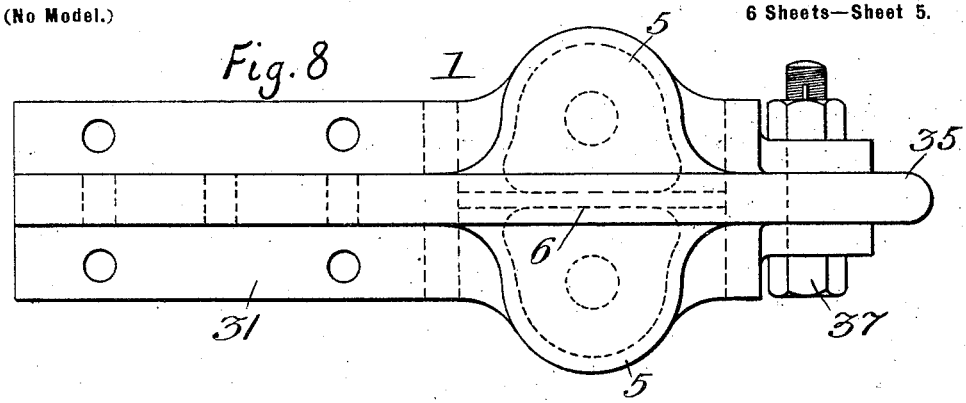
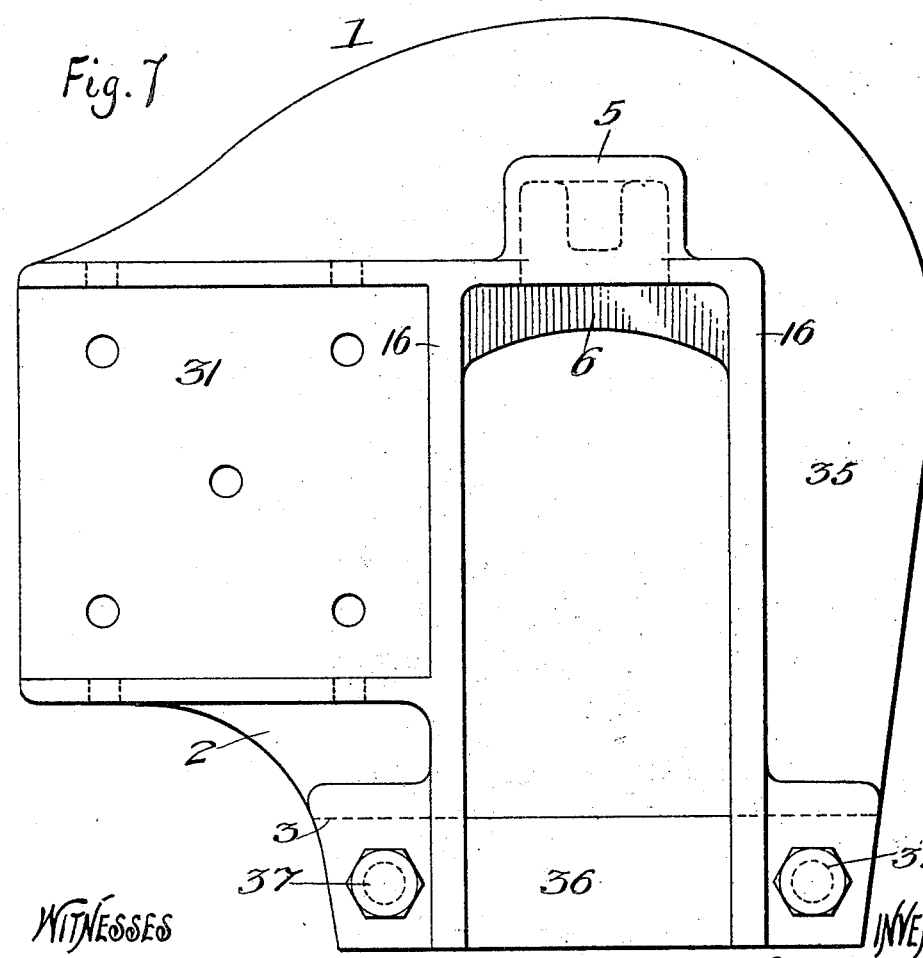

No. 686,796. Patented Nov. 19, 1901.
R. C. WRIGHT & F. E. STEBBINS.
CAR TRUCK.
(Application filed Nov. 12, 1900.)
(No Model.) 6 Sheets—Sheet 6.
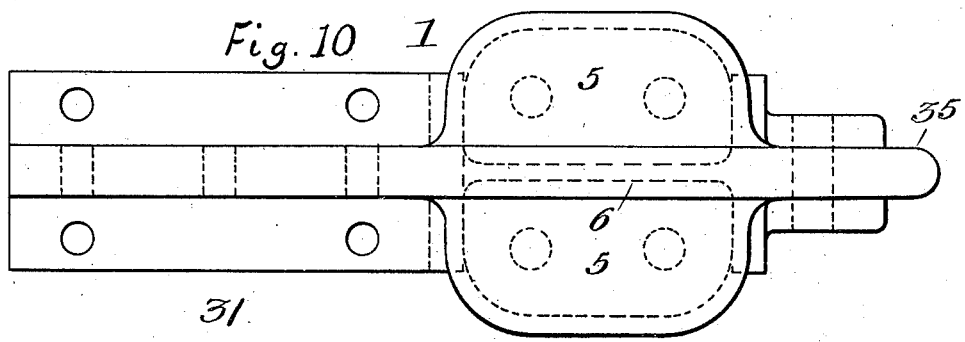
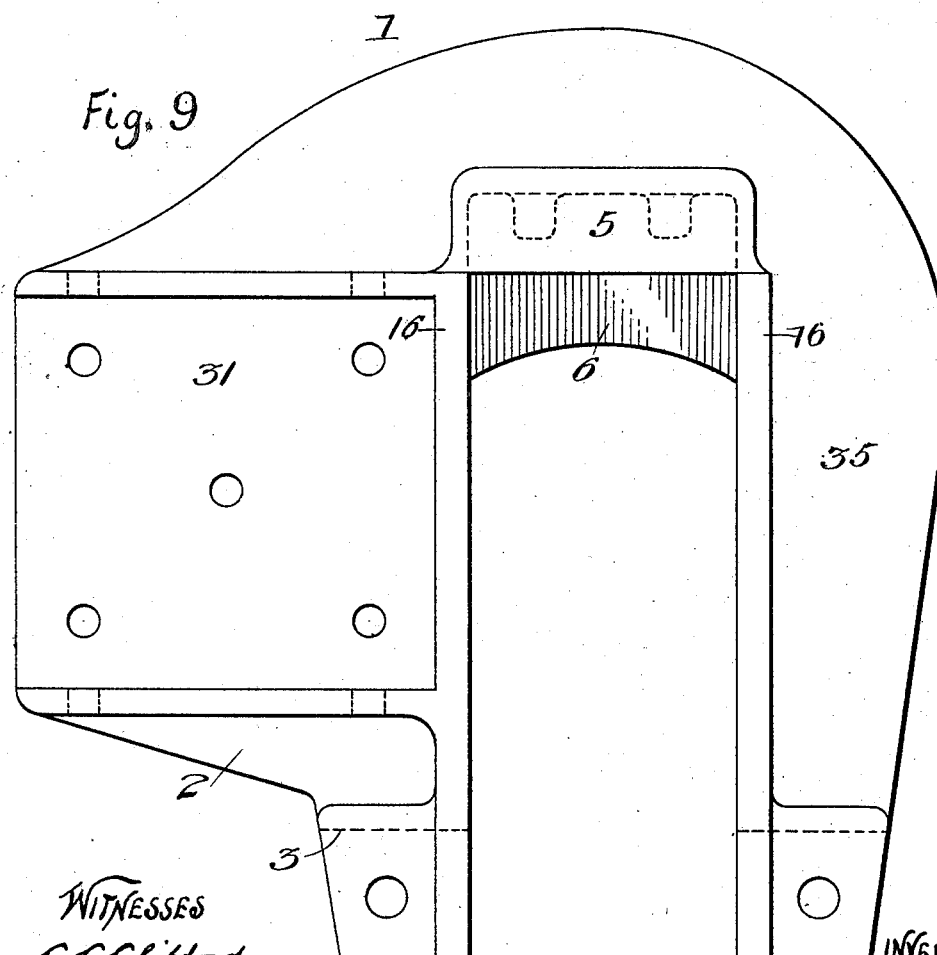
WITNESSES
C. C. Clifford
D. W. Edelen
INVENTORS
Ransom C. Wright
F. E. Stebbins

UNITED STATES PATENT OFFICE.

RANSOM C. WRIGHT, OF PHILADELPHIA, PENNSYLVANIA, AND FRANK E. STEBBINS, OF WASHINGTON, DISTRICT OF COLUMBIA; SAID STEBBINS ASSIGNOR TO SAID WRIGHT.

CAR-TRUCK.

SPECIFICATION forming part of Letters Patent No. 686,796, dated November 19, 1901.

Original applications filed May 27, 1896, Serial No. 593,261, and July 20, 1896, Serial No. 599,835. Divided and this application filed November 12, 1900. Serial No. 36,191. (No model.)

*To all whom it may concern:*

Be it known that we, RANSOM C. WRIGHT, residing at Philadelphia, in the county of Philadelphia and State of Pennsylvania, and FRANK E. STEBBINS, residing at Washington, District of Columbia, citizens of the United States, have jointly invented certain new and useful Improvements in Car-Trucks, of which the following is a specification.

The invention relates to car-trucks, and embraces certain improvements disclosed in our applications, Serial No. 593,261, filed May 27, 1896, and Serial No. 599,835, filed July 20, 1896, of which said applications the present application is a division.

The purpose of our invention is mainly threefold—to wit, the production of a car-truck which shall have the side frames securely united by improved transoms, preferably located between the pairs of wheels, which shall have the pedestals so fashioned that a pair of wheels and journal-boxes can readily be removed by jacking up the frame a short distance, and which shall have the heads of the pedestals when a plurality of springs are used provided with seats and adequately strengthened to withstand all strains to which they may be subjected.

With these main ends in view our invention consists in a car-truck having the side frames united by one or more transoms, said transom or transoms having flanged and curved ends and the flanges of the curved ends overlapping the sides of the frames. Further, it consists in a car-truck having pedestal-springs and pedestals, preferably of cast metal, provided with outer jaws which hook over the journal-boxes and extend downwardly, the openings between said outer jaws and the inner jaws being closed by removable tie bars or pieces. Further, it consists in a car-truck having cast pedestals with seats for a plurality of pedestal-springs and strengthening-webs which are located between springs when the latter are in position. Finally, it consists in certain novelties of construction and combinations of parts hereinafter set forth and claimed.

The accompanying drawings illustrate several examples of the physical embodiment of our invention in car-trucks constructed according to the best modes or methods we have so far devised for the practical application of the principles.

Figure 1 is a side elevation view of a car-truck, showing the flanges of the ends of the transoms overlapping a side frame, the pedestals, and the webs which separate springs and strengthen the pedestals. Fig. 2 is a top plan view of Fig. 1, also showing one-half of the truck-frame and the transoms broken away and the tops of the seats for two springs, one being located on each side of the web, which is indicated by dotted lines. Figs. 3 and 4 are respectively side elevation and top plan views of a pedestal similar to those shown in Fig. 1, but made detachable and having seats for four springs. Figs. 5 and 6 are respectively side elevation and top plan views of a detachable pedestal having a seat for a spring and the outer jaw and tie-piece similar to those shown in Fig. 1. Figs. 7 and 8 are respectively side elevation and top plan views of a detachable pedestal with a web similar to those shown in Fig. 1, but with spring-seats made in the shape of pockets. Figs. 9 and 10 are respectively side elevation and top plan views of a pedestal having a web similar to those shown in Fig. 1, but with spring-seats for four springs and said seats in the shape of shallow pockets.

Referring to the several figures, the numeral 1 designates the pedestal; 2, the integral jaws of the pedestals adjacent the side frames; 3, slots in the said jaws; 4, transverse holes through said jaws; 5, seats for the upper ends of spiral or helical springs cast integral with the pedestals; 6, webs shown in elevation in the side views and by dotted lines in the top plan views, which are cast integral with the pedestals and separate springs, the said webs extending down and within approximately two inches of the journal-boxes; 7 7, in Figs. 1, 2, 3, 4, 5, and 6, the outer jaws of the pedestals, which extend downwardly and hook over the journal-boxes, as clearly shown at the right hand in Fig. 1 and also in Fig. 5; 8, slots in the said outer pedestal-jaws; 9, transverse holes through the said jaws; 10, removable and substantially rectangular tie-bars having holes which register with holes in the inner and outer jaws of the pedestals; 11, bolts which secure the ends of the tie-bars within the slots of the jaws; 12, the inner bearing-flanges for the journal-boxes; 13, the outer bearing-flanges for the journal-boxes; 14, bearing-flanges on the tie-bars; 15, the extended ends of the tie-bars, which fit the slots in the pedestal-jaws which are adjacent the side frames, and 16 represents flanges adjacent the webs 6 on each side of a pedestal for further strengthening the same, said flanges being a continuation of the bearing-flanges for the journal-boxes, as shown, and preferably cast integral with the seats for the springs.

In Figs. 1 and 2 the numeral 17 designates the cast-metal side pieces or frame, in this instance integral with the cast pedestals. 18 19 are top and bottom flanges for stiffening the side pieces; 20 21, the transoms; 22, the top flanges of the transoms, which face each other; 23, the bottom flanges of the transoms; 24, the curved ends of the transoms; 25, the top flanges of the curved ends overlapping the side pieces; 26, the bottom flanges overlapping the side pieces; 27, rivets which secure the webs of the transoms to the side pieces; 28, rivets which secure the top flanges of the bent ends of the transoms to the flanges of the side pieces, and 29 represents rivets which secure the lower flanges of the curved ends of the transoms to the flanges of the side pieces.

In this example 30 is one of the two springs which are used in connection with each pedestal. The tops of the seats for both springs are shown in Fig. 2. These seats are plane surfaces or quite shallow recesses and serve as bearings for the upper ends of the springs, the lower ends of the said springs being supported by the journal-boxes in any desirable way.

The example of pedestal shown in Figs. 3 and 4 is of cast metal, made separate from the side piece of the main truck-frame and adapted to be secured to an end thereof by a neck or extension 31 of any approved construction. Two spiral springs are to be used on each side of the web 6 and with their upper ends bearing against the seats, which in this case are provided with flanges 32, forming shallow pockets.

The pedestal shown in Figs. 5 and 6 is of cast metal and has a neck or extension 31 and is adapted to be secured to the end of the side frame. A seat 33 for a single or compound spring is shown, and the curved flanges 34 constitute a pocket for the upper end of the spring.

The cast-metal pedestals shown in Figs. 7, 8, 9, and 10 have the neck or extension 31, like the other detachable pedestals described, but differ from them in having the outer pedestal-jaws 35 extending down below the bottoms of the journal-boxes and the openings between the jaws closed by a plain tie-bar 36, secured by bolts 37 within the slots made in the ends of the jaws, as shown in Fig. 7. The flanges for guiding the journal-boxes are of the shape shown. In Figs. 7 and 8 a single spring is in practice to be located on each side of the web 6 and the upper ends of both springs confined within the pockets or seats. In Figs. 9 and 10 two springs are to be used on each side of the web 6, with their upper ends bearing against the seats and their lower ends supported by the journal-boxes in any desirable way.

From the foregoing description it is obvious that we have produced a car-truck which fulfils all the conditions set forth as the purpose and end of our invention, besides possessing other desirable features and characteristics which will be recognized by those familiar with the art. The transom or transoms, with curved ends and with the top flanges overlapping the side frames, forms or form a very secure and rigid union of the parts. The outer jaws of the pedestals, hooking over the journal-boxes and extending downwardly, hold the boxes in place, take the outward strains, and allow a pair of wheels and boxes to be rolled out by removing the tie-bar and jacking up the ends of the frame a very short distance, and the webs 6, integral with the cast pedestals and which separate the springs, add great strength and stiffen the outer jaws.

It will be observed that the outer jaws 7 of the pedestals extend downwardly about two-thirds the vertical heights of the journal-boxes. This distance can of course be varied, but should be sufficient to enable a jaw to hold a box in position should a tie-bar become broken or detached.

While we have illustrated and described several examples of the physical embodiment of our invention, we do not wish it understood that the scope thereof be limited to said pictured examples, inasmuch as the improvements can be embodied in other shapes and modified forms. The novel features relating to the pedestal portion of the truck can be embodied in a detachable pedestal or a pedestal which is integral with a side frame. Z-shaped beams can be substituted for the channel transom-beams shown, part of our improvements abstracted and incorporated in trucks of dissimilar construction, and other obvious changes introduced in practice which will not constitute substantial departures.

What we claim is—

1. The combination in a car-truck, of side frames and a transom or transoms uniting the frames; the said transom or transoms having curved ends and flanges which overlap the edges of the frames.

2. The combination in a car-truck, of side frames, and transoms uniting the frames; the said transoms having curved ends and top flanges which overlap the side frames.

3. The combination in a truck, of side frames, and channel-transoms with curved ends uniting the frames; the top and bottom flanges of the said curved ends of the transoms overlapping the side frames.

4. The combination in a truck, of side frames, and a transom member uniting the said side frames; the said transom member having ends with top flanges which overlap the side frames.

5. The combination in a truck, of side frames and flanged transoms; said transoms having curved ends extending parallel with the frames and the flanges facing each other.

6. A car-truck pedestal having a seat for a spring, a jaw hooking over the journal-box which latter has vertical movement against a spring, and removable means for closing the space at the side and bottom of the journal-box.

7. A car-truck pedestal having a plurality of seats for springs, a jaw which hooks over the journal-box, and removable means for closing the space at the side and bottom of the journal-box.

8. A car-truck pedestal having a jaw which hooks over and extends part way down the side of the journal-box, a removable part closing the space at the side and bottom of the box, and a seat for a spring; the journal-box adapted to move vertically and compress the spring, and the jaw which hooks over the box adapted to hold the same in place should the tie-bar become detached.

9. A car-truck pedestal having a jaw 7 which hooks over a journal-box; a jaw, as 2; and removable means uniting the jaws; in substance as and for the purpose set forth.

10. The combination with a pedestal, of a journal-box and a spring; said pedestal having a seat for the spring, a jaw hooking over the box, removable means for closing the space at the side and bottom of the box, and bearing-flanges for the box.

11. The combination with a pedestal, of a journal-box, and a spring; said pedestal having a slotted jaw 7 which hooks over the journal-box, a jaw 2, and means for closing the space at the side and bottom of the box.

12. A pedestal having a slotted jaw 7, a slotted jaw 2, and a tie-bar detachably secured to the said jaws by bolts.

13. The combination with a pedestal, of a spring, a seat for the spring, a jaw hooking over the box, and means having parts thereof at right angles to each other for closing the space at the side and bottom of the box.

14. A metallic car-truck pedestal having pedestal-jaws, a vertical web, and seats for springs on opposite sides of said web; the several parts being cast integrally; in substance as set forth.

15. An integral cast-metal car-truck pedestal having jaws, a web 6, and a plurality of seats for springs.

16. An integral cast-metal car-truck pedestal having jaws, a web 6, a plurality of seats for springs, and flanges 16 adjacent the webs.

17. An integral cast-metal side frame for a car-truck having pedestals and each pedestal provided with jaws, a web 6, and a plurality of seats for springs; in substance as set forth.

18. The combination with an integral cast-metal side frame for a truck having pedestals with jaws, and each pedestal provided with a web 6 and a plurality of seats for springs on opposite sides of the web, of journal-boxes, and springs interposed between the journal-boxes and the said seats.

19. An integral cast-metal side frame for a truck having pedestals, webs 6, 6, seats for spiral springs each side of a web 6, and pairs of pedestal-jaws; the seats each side of a web being adapted to receive the upper parts of springs which are supported by a journal-box.

20. An integral cast-metal side frame for a car-truck having pedestals with jaws, webs 6, 6, and seats for springs on opposite sides of and above the webs; in substance as set forth.

21. An integral cast-metal pedestal having jaws with flanges to guide a journal-box, a web 6, and seats 5, 5, for springs which are supported by the journal-box and rest against the seats.

22. An integral cast-metal pedestal having jaws and a plurality of separately-disposed seats for spiral or helical springs which are adapted to be supported by a journal-box.

23. A car-truck having two metal sides with cast pedestals located outside the wheels, and a transom or transoms uniting the sides adjacent their central portions; said pedestals having webs 6 and seats for springs which are supported by journal-boxes.

24. A truck-frame having two cast-metal sides with pedestals cast integral therewith, said sides being located outside the wheels, a transom or transoms uniting the sides adjacent their centers and extending between the pairs of wheels, webs 6, seats for springs 5, and said frame combined with springs and movable journal-boxes.

In testimony whereof we affix our signatures in presence of witnesses.

RANSOM C. WRIGHT.
FRANK E. STEBBINS.

Witnesses as to signature of Ransom C. Wright:
LOUIS T. PYOTT,
WILLIAM C. STOEVER.

Witnesses as to signature of Frank E. Stebbins:
JOHN F. BURCH,
F. LEE.